UNITED STATES PATENT OFFICE 2,342,345

WHITENING EGGS

James D. Ingle, Chicago, Ill., assignor to Industrial Patents Corporation, Chicago, Ill., a corporation of Delaware No Drawing. Application October 30, 1940,
Serial No. 363,491

6 Claims. (Cl. 99—230)

This invention relates to the treatment of shell eggs and has to do particularly with a method of improving the color of egg shells.

It is well known that some eggs have a natural color, such as buff. The color of egg shells in many cases affects the marketability of the eggs. Many consumers prefer white shell eggs, although the color of the shell does not affect the quality of the egg material.

The principal object of this invention is to provide a method of decolorizing or improving the color of colored egg shells without affecting the egg material.

The present invention contemplates treatment of colored shell eggs with a reducing agent whereby the color of the egg shell is substantially improved or whitened.

It has been found that reducing agents remove from the egg shell the bloom which is a protein material containing the color. The reducing agent causes a disintegration and removal of the bloom.

Any suitable reducing agent may be used, although I prefer to use those having a substantial solubility in water. Examples of reducing agents are: "Lykopon" ($Na_2S_2O_4$), sulfurous acid, "Rongalite" (formaldehyde sulfoxalate), sodium stannite, formaldehyde peroxide, and hydrogen peroxide in acid. Mixtures of two or more of the foregoing reducing agents may be used.

The reducing agent is preferably used in a fluid or liquid form in order to facilitate proper contact with the egg shell. Aqueous solutions are preferred although other solvents in which the reducing agent is soluble may be employed. An aqueous solution of the reducing agent has been found to give good results.

In practicing the invention, the eggs are subjected to the action of a solution of the reducing agent and are then washed while the surface is brushed lightly if desired. The eggs may be washed with a dilute acid or alkali neutralizing solution after the treatment in some cases to help neutralize any acidity or alkalinity left by the reducing agent.

The solution of the reducing agent may be improved by the addition of a small amount of a wetting agent, for example, the sulphonated aromatic naphthalene product known on the market as "Nacconol NR." Any wetting agent which is not destroyed or whose usefulness is not impaired by the presence of a strong acid is satisfactory for use. Other examples of wetting agents are sulphated higher alcohols, such as the commercial product "Duponol", alkylated aryl sulphonates, such as the commercial product "Santomerse", sulphated esters of higher alcohols and dibasic acids, such as the commercial product "Aerosol", and the like.

The amount of reducing agent is not critical, but in practice I prefer to use a solution containing from 0.1 per cent to 10 per cent, although concentrations up to 30 or 40 per cent of reducing agent are contemplated. Usually solutions of about 2.5 per cent are used. The most satisfactory reducing agents are solutions of "Lykopon", "Rongalite" and sodium stannite.

I have found that solutions containing 2 per cent "Lykopon" or 2 per cent "Rongalite" or 5 per cent sodium stannite produce satisfactory results for the purposes of my invention.

As an example of the operation of my invention, the eggs are immersed in the solution for a period of about five seconds to ten minutes or more and then washed with water. Buff colored shell eggs treated in accordance with this invention may be changed to a substantially white color comparable to that of the usual white color of egg shells.

Obviously many modifications and variations of the invention hereinbefore set forth may be made without departing from the spirit and scope thereof, and therefore only such limitations should be imposed as are indicated in the appended claims.

I claim:

1. A method of improving the color of shell eggs having a relatively dark natural color, which comprises subjecting the shell to the action of a reducing agent of sufficient strength to cause substantial disintegration and removal of color-containing protein.

2. A method of treating naturally colored shell eggs to lighten the color, which comprises treating the shell with a solution of a reducing agent of sufficient strength to substantially remove the color containing material.

3. A method of decolorizing shell eggs having a natural color, which comprises applying to the shells an aqueous solution of a reducing agent of sufficient strength to cause substantial disintegration and removal of the protein containing the color and thereafter washing the reducing agent from the surface of the shells.

4. A method according to claim 2 in which the reducing agent is sodium hyposulfite.

5. A method according to claim 2 in which the reducing agent is formaldehyde sulfoxalate.

6. A method according to claim 2 in which the reducing agent is sodium stannite.

JAMES D. INGLE.